(12) United States Patent
Plishner

(10) Patent No.: US 6,416,334 B1
(45) Date of Patent: Jul. 9, 2002

(54) COMBINATION MULTI-CONDUCTOR/OPTICAL FIBER CONNECTOR

(76) Inventor: Paul J. Plishner, 42 Foster Crossing, Southampton, NY (US) 11968

( * ) Notice: Subject to any disclaimer, the term of this patent is extended or adjusted under 35 U.S.C. 154(b) by 0 days.

(21) Appl. No.: 09/536,082

(22) Filed: Mar. 24, 2000

(51) Int. Cl.[7] .................................................. G02B 6/38
(52) U.S. Cl. ......................................... 439/75; 439/577
(58) Field of Search ................................ 385/1, 2, 3, 4, 385/5, 6, 7, 8, 75, 101; 439/577

(56) References Cited

U.S. PATENT DOCUMENTS

| | | | |
|---|---|---|---|
| 3,154,360 A | 10/1964 | Plishner | 439/335 |
| 4,295,707 A | 10/1981 | Nakai et al. | 385/101 |
| 4,458,985 A | 7/1984 | Balliet et al. | 385/65 |
| 4,494,822 A | 1/1985 | Harvery | 385/71 |
| 4,767,181 A | 8/1988 | McEowen | 385/78 |
| 4,779,948 A | 10/1988 | Wais et al. | 385/88 |
| 4,896,939 A | 1/1990 | O'Brien | 385/56 |
| 5,140,659 A | 8/1992 | Minds et al. | 385/66 |
| 5,467,420 A | 11/1995 | Rohrmann et al. | 385/101 |
| 5,574,815 A | 11/1996 | Kneeland | 385/101 |
| 5,796,898 A | 8/1998 | Lee | 385/78 |
| 5,937,121 A | 8/1999 | Ott et al. | 385/59 |

Primary Examiner—Tulsidas Patel
(74) Attorney, Agent, or Firm—Ware, Fressola, Van Der Sluys & Adolphson LLP

(57) ABSTRACT

An electro-optical connector consists of a plug and a socket, each bearing both a multi-conductor and at least one optical fiber. The socket has an elongated cavity and a plurality of longitudinally spaced first contact elements. The plug has mating longitudinally spaced contacts. The plug and socket both has at least one optical fiber coaxial with the plug and the cavity. The plug and socket can be engaged in a predetermined orientation only.

13 Claims, 3 Drawing Sheets

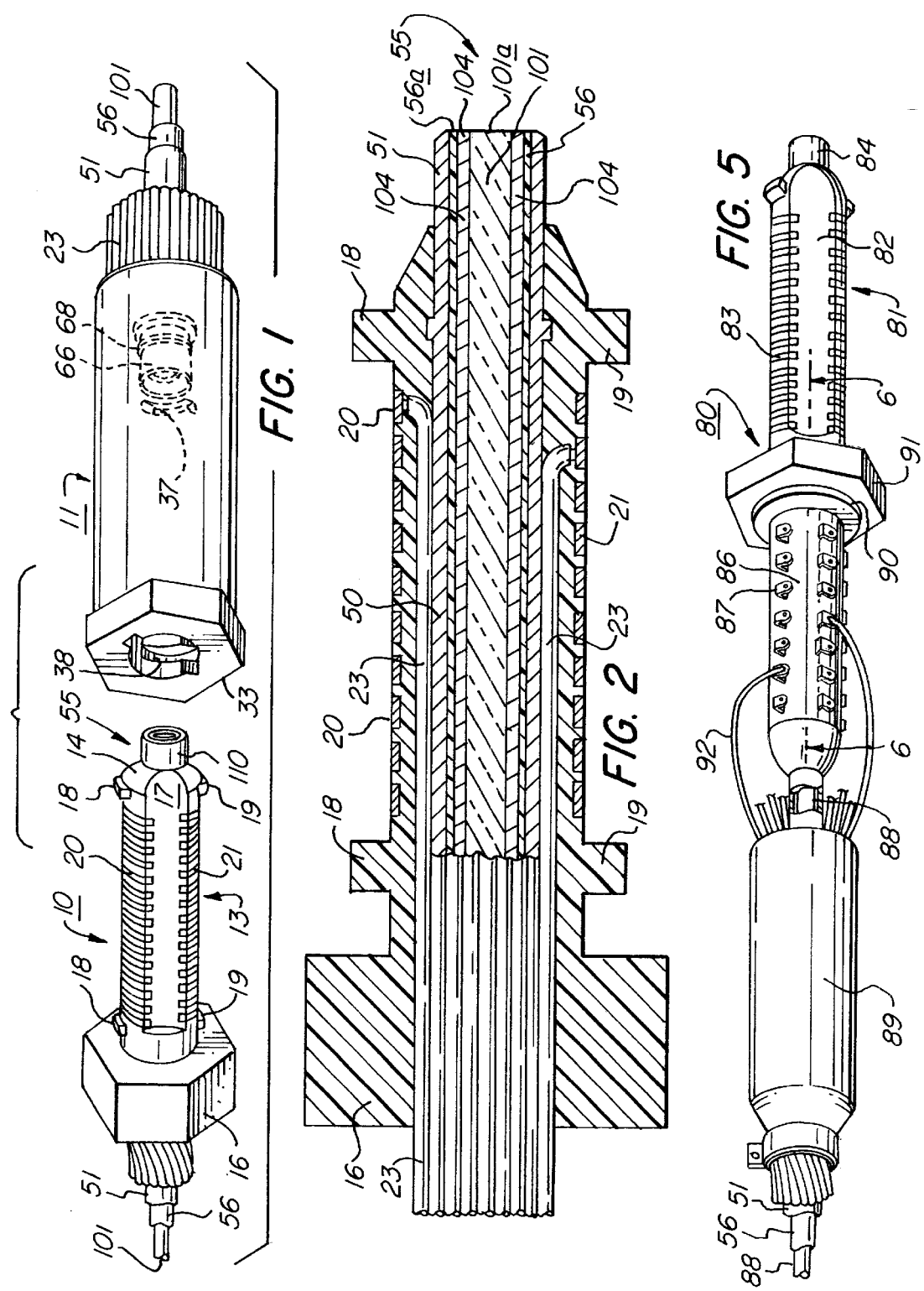

COMBINATION MULTI-CONDUCTOR/OPTICAL FIBER CONNECTOR

FIELD OF THE INVENTION

The present invention pertains to the fields of connectors for electrical and of optical signal-bearing lines. More particularly, the present invention pertains to a connector for simultaneously connecting both optical fibers and multi-conductor electrical lines.

BACKGROUND OF THE INVENTION

Multi-element electrical connectors for simultaneously connecting several low frequency (including DC) current-carrying conductors (i.e. two electrical lines each including several current-carrying conductors) are well known in the art. Such multi-element connectors often include a plug member and a socket, with one of the connector members having several contact-carrying wells or recesses, and the other connector carrying corresponding upstanding metal pins or rods arranged to slidably register with the respective recesses.

The prior art also includes connectors for connecting optical fibers. An optical fiber typically consists of a core of dielectric transparent material surrounded by a layer of transparent cladding material having a refractive index lower than that of the core. An optical fiber connector joining two lengths of optical fiber is intended to arrange that light energy will propagate from one of the lengths to the other without appreciable loss, i.e. without what is called insertion loss that occurs when light is inserted by the connector into the other fiber. To keep insertion loss low when connecting ends of two optical fibers, it is important to register the centers of the fiber end faces, and to precisely align the fibers where they are joined, and also to have the joined ends abut over the entire surface of each end with at most a small gap (not necessarily a gap of air). To the extent that the connection provides essentially a direct continuation of the optical fiber material from one fiber length to the next, without any appreciable intervening gap, the insertion loss is minimized.

U.S. Pat. No. 4,458,985 discloses a field-installable optical fiber connector, consisting of two identical halves, each coined or stamped in a high precision manufacturing operation so as to ensure that the optical fiber lengths being joined are both precisely aligned and their end faces abut each other with at most a small gap. Each coined or stamped connector half includes a trench with a pair of parallel, resilient supporting rails for holding the respective optical fiber centered in the trench. Each connector half also has coined into a surface a pair of alignment holes and a pair of mating protuberances; the holes and protuberances are separated from each other so as to aid in aligning, and are of a shape and size to mate when the connector halves are mated. An optical fiber in a connector half is secured in place by staking or hot upsetting.

The prior art further includes a multi-conductor/coaxial electrical connector for simultaneously connecting a multi-conductor and a coaxial cable. For example, U.S. Pat. No. 3,154,360 provides a plug member and a socket (receptacle) member. The plug member includes a cylindrical shank having diametrically opposite longitudinally extending flats on which there are contact elements. A set of contact elements are provided as longitudinally spaced, transversely extending arcuate conductor strips embedded in the shank and coplanar with the curved surfaces of the shank. Two opposite longitudinally extending sets of such contact elements are provided, each set being disposed between the flats. A coaxial conductor collar and pin project forwardly of the leading end of the shank and are connected respectively to a tubular conductor and a coaxial conductor housed in the shank. The contacts and the collar and pin are connected to corresponding conductors and a coaxial line or, alternatively, there is provided a post directed coaxially rearwardly of the shank and carrying connector lugs and a coaxial connector connected respectively to the contact elements and to the collar and pin.

The socket member includes a longitudinally extending body member having a cylindrical cavity. At the base of the body member is mounted a coaxial collar and sleeve structure that is slidably engageable with the plug-mounted collar and pin. The socket includes a set of contact elements defined by resilient contacts disposed in recesses formed in the face of the socket member cavity and corresponding in location to the plug contact members. An orienting means is provided for maintaining a predetermined angular orientation between the plug and socket members during relative sliding coupling and permitting relative rotation when the plug member has been inserted to the maximum depth permitted by the socket member. The orienting means includes at least one longitudinally extending groove formed in the cavity face of one of said socket and plug members and a protuberance corresponding in shape to the cross-section of the respective groove and located at the leading and trailing ends of the other of said plug and socket members. Each longitudinal groove joins adjacent to its leading and trailing end a circumferentially extending groove of limited length.

What is still needed is a connector for simultaneously connecting several low frequency current-carrying conductors (including DC) and also two ends or more of optical fiber.

SUMMARY OF THE INVENTION

Accordingly, the present invention provides an electro-optical connector consisting of a plug and a socket, each bearing both a multi-conductor and at least one optical fiber, and when in intercoupled condition, provides a connection for both the multiconnectors of the plug and socket, and also for the at least one optical fibers of the plug and socket. The socket has an elongated longitudinally extending cavity formed therein, and a plurality of longitudinally spaced mutually insulated first contact elements disposed within the cavity. The mating plug slidably registers with the cavity between advanced and retracted positions and has a leading end directed toward the base of the cavity. In addition, there are a plurality of longitudinally spaced, mutually insulated second contact elements disposed along the plug, and means maintaining a predetermined angular orientation between the plug and socket during relative sliding of the plug and socket, and permitting relative rotation of the plug and socket at the plug advanced position. The first and second contact elements are out of engagement at the predetermined angular orientation and in engagement upon rotation in a single predetermined sense from the predetermined angular orientation to a closed contact position. Separable collar members and optical fiber lengths are coaxial with and extend to the leading end of the plug and to the base of the cavity, and so define an optical fiber connector. The optical fiber connector is in a coupled condition when the plug is in its cavity advanced position.

In a further aspect of the invention, one of the collar members nests in the other of the collar members when the plug is in the advanced position.

In another, further aspect of the invention, the electro-optical connector includes a plurality of longitudinally aligned sets of the longitudinally spaced second contact elements and a corresponding plurality of longitudinally aligned sets of the first longitudinally spaced contact elements, and the peripheries of the sets of second contact elements are of arcuate configuration and extend circumferentially of the plug for less than 360° and in a straight line, lengthwise of the connector.

In another, further aspect of the invention, the socket includes a well portion defined by a cylindrical wall, the inner surface thereof having longitudinally spaced recesses formed therein, the first contact elements being located in the recesses and normally projecting above the upper edges thereof and being resiliently inwardly urged by the second contact elements during engagement therewith, and including lugs connected to the first contact elements and projecting through the cylindrical wall.

In another, further aspect of the invention, the orienting means is defined by at least one longitudinally extending groove formed in one of the connector members and at least one slidably engaging protuberance mounted on the other of the members.

In another, further aspect of the invention, the plug and socket each further include an optical fiber retainer substantially cylindrical in form, the plug optical fiber retainer extending along the length of the plug to the leading end of the plug, and the socket optical fiber retainer extending along the length of the socket to the base of the cavity. Each each optical fiber retainer in turn includes at least four resiliently pliable rails extending along the length of the optical fiber retainer, the four rails so shaped and so positioned so as to exert a radial force tending to center and align the optical fibers so as to be coaxial with the optical fiber retainer.

In a still further aspect of the invention, the optical fiber retainers of the plug and socket also include teeth projections, the plug teeth projections angled toward the leading end of the plug, and the socket teeth projections angled toward the base of the cavity, the teeth projections thereby providing resistance to any backing out of the optical fiber within the plug optical fiber retainer away from leading end of the plug, or within the socket optical fiber retainer away from the base of the cavity.

BRIEF DESCRIPTION OF THE DRAWINGS

The above and other objects, features and advantages of the invention will become apparent from a consideration of the subsequently detailed description presented in connection with accompanying drawings, in which:

FIG. 1 is a perspective view of an electrical connector embodying the present invention, including a plug section and a socket section, and illustrated in an uncoupled condition;

FIG. 2 is a medial longitudinal sectional view of the plug section;

FIG. 5 is an exploded perspective view of a modified form of the present invention;

BEST MODE FOR CARRYING OUT THE INVENTION

Figure 3:
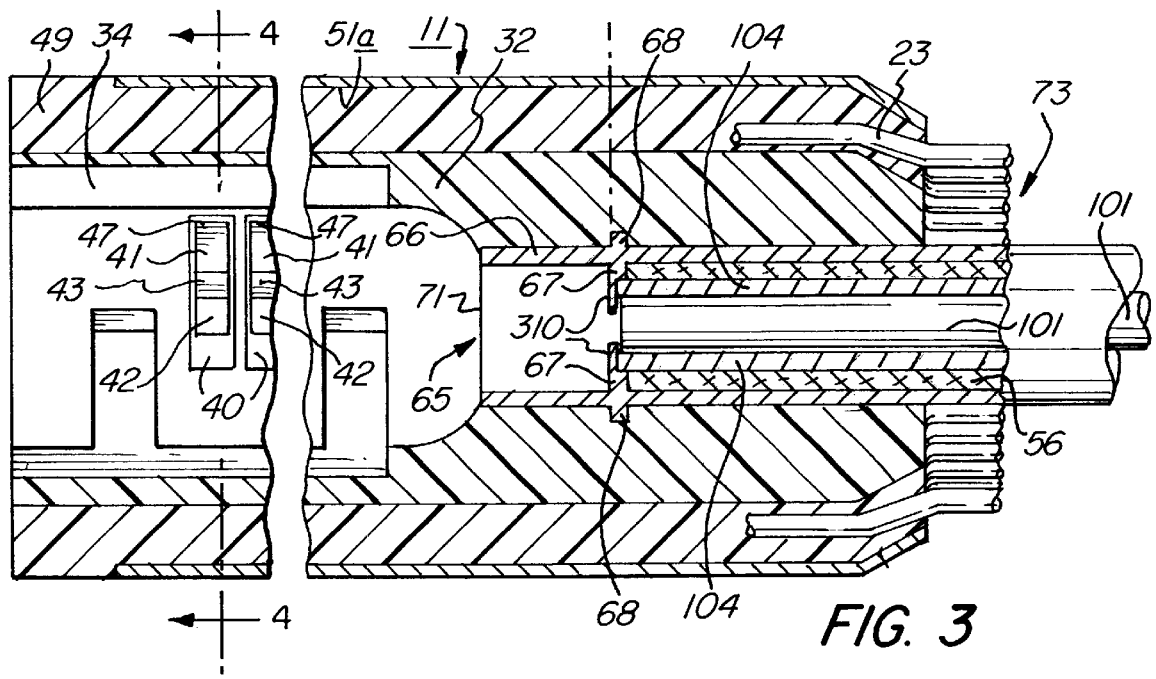
FIG. 3 is a fragmentary medial longitudinal sectional view of the socket section.
Figure 4:
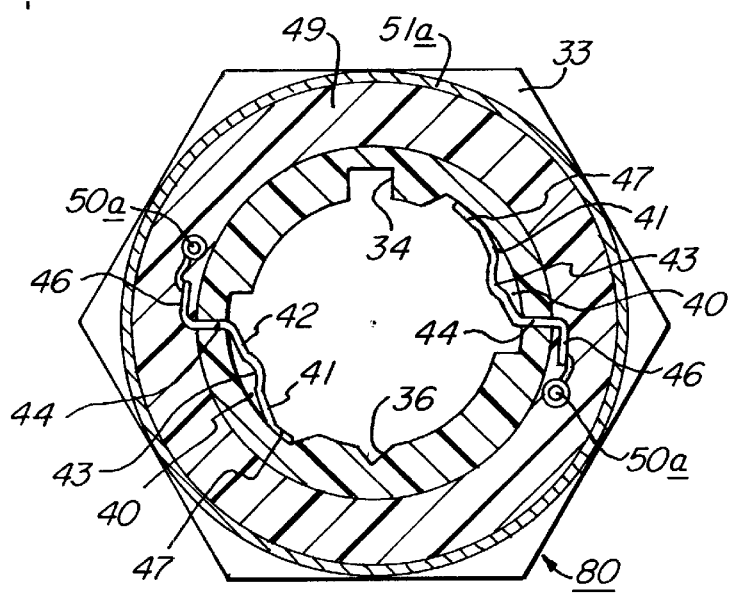
FIG. 4 is a sectional view taken along line 4—4 in FIG. 3.

Referring now to the drawings, and more particularly to FIGS. 1 to 4 and 7A and 7B, which illustrate a preferred embodiment of the present invention, the improved electrical connector includes a plug 10 and a socket 11. Plug 10 is formed of an insulating material such as thermoplastic or thermosetting resin and includes a longitudinally extending tubular shank 13 having a tapered frusto-conical leading end 14 and provided at its trailing end with an enlarged head 16, which defines a finger manipulating piece. Shank 13 is of substantially circular transverse cross-section and is provided with diametrically opposite longitudinally extending flat surfaces 17 extending from the tip 14 thereof to a point short of the head 16, flats 17 being closer to the axis of the shank 13 than the remaining arcuate peripheral surface thereof.

Located on one of the arcuate surfaces of shank 13 adjacent tip end 14 are a pair of longitudinally spaced upright projections 18 having substantially parallel side walls, the forward projection being immediately posterior to the leading end 14 of the shank 13 and the rear projection being just forward of plug head 16. On the opposite arcuate surface of the shank 13 there may be located longitudinally spaced prismatic projections 19 which are diametrically opposite to the respective projections 18.

A set of longitudinally spaced and longitudinally aligned arcuate metal contact elements 20 are embedded in shank 13 along one of the arcuate peripheral surfaces thereof. The contact elements 20 extend circumferentially for less than 180° and their outer surface is coplanar with the arcuate peripheral surface of the shank 13 and their edges coplanar with flats 17. Another set of longitudinally spaced, longitudinally aligned arcuate contact elements 21 are provided, laterally aligned with the first set, the outer surfaces of elements 21 being coplanar with the arcuate surface of shank 13, the end edges of corresponding pairs of contact elements 20, 21 intermediate the ends thereof is an arcuate recess 22.

Connected to each of contact elements 20 and 21 is an insulator covered conductor 23, the end of which is soldered to a corresponding contact element, the conductors 23 being disposed along the inner peripheral base of shank 13 and extending longitudinally through the trailing end thereof.

Housed in and coaxial with shank 13 is a tubular strength member 50, preferably made of metal but also advantageously made from a hard plastic, which projects through the leading end of the shank 13, the insulated conductor 23 being sandwiched between the confronting faces of shank 13 and the tubular strength member 50. The leading end or section 51 of the tubular strength member 50 is longitudinally slit and delineated from the remainder thereof by inwardly and outwardly directed peripheral flanges respectively, flange 53 registering with a mating peripheral groove formed in the inner face of shank 13 to lock the strength member 50 against longitudinal movement. The leading section 51 defines the collar or sleeve of a plug optical fiber coupling member 55 including an optical fiber retainer 56 with a leading end 56a. Retainer rails 104 (see FIGS. 7A and 7B), extend inward from the optical fiber retainer 56 and also extend longitudinally along the length of the retainer 56. An optical fiber 101 is located within and is coaxial with the optical fiber retainer 56, and terminates at the leading end 56a of the optical fiber retainer 56. Optical fiber 101 is supported in tube 50 by the optical fiber retainer 56 and the retainer rails 104, and also by teeth 105 (see FIGS. 7A and 7B) projecting inward and forward (in the direction of the leading end 56a). The teeth 105 prevent the optical fiber from backing into the plug 10, away from the leading end 56a.

Figure 7A:
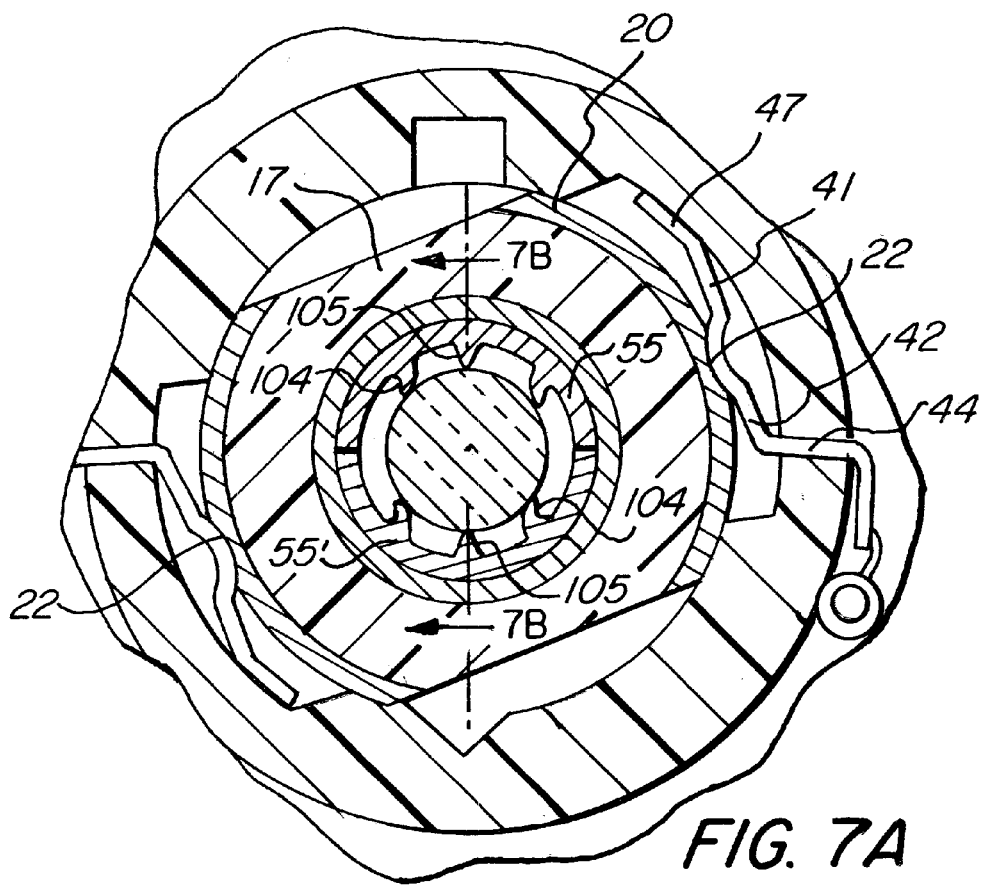
FIG. 7A is a sectional view of an interconnected plug and socket, showing the optical fiber within the optical fiber retainer in the plug, and showing supporting and positioning retainer rails and forward directed teeth.
Figure 7B:
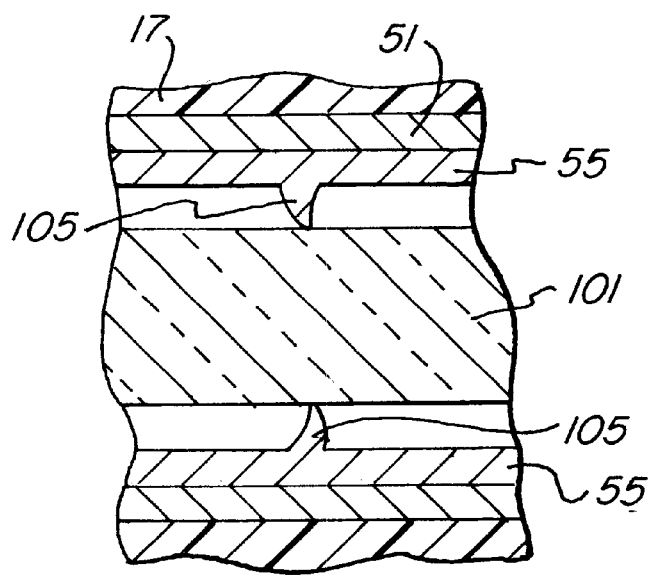
FIG. 7B is a sectional view taken along line 7B—7B in FIG. 7A.

The retainer rails 104 are made thin enough that they will give under pressure, as shown in FIG. 7B. The rails are preferably made of a soft metal (softer than the surface of the optical fiber) so as to resiliently deform under pressure. The retainer rails 104 provide a radial centering force at four different but symmetrical places. The centering force tends to keep the optical fiber 101 centered in the optical fiber retainer 56. The optical fiber 104 is inserted into the plug 10 so that it slides along the retainer rails 104 until it protrudes slightly from the terminus of the plug 10, i.e. past the leading end 56a of the optical fiber retainer 56. The protruding optical fiber face is then ground flat and coplanar with the face of the optical fiber retainer leading end 56a and the leading end of the tubular strength member 50. The retainer rails 104 are also advantageously made of a plastic. The plastic is preferably one having a low coefficient of dynamic friction, allowing the optical fiber to be inserted into the plug 10 and pushed along the deformed rails until it reaches out past the leading end 56a of the optical fiber retainer 56. Alternatively, a plastic can be used in combination with a lubricant to allow inserting the optical fiber into the plug 10.

The socket 11 (see especially FIG. 3 and FIG. 4) includes a longitudinally extending inner shell 32, preferably formed of an insulating plastic material in any well known manner and having at its trailing end an enlarged head 33 of hexagonal cross-section. A pair of oppositely disposed longitudinally extending grooves 34 and 36 respectively are formed in the inner face of the shell 32 and extend from the open trailing end thereof to a point short of the leading end. Groove 34 is of channel-shaped transverse cross-section corresponding in shape to the plug protuberance 18, and the groove 36 is of triangular transverse cross-section corresponding in shape to the plug protuberance 19, to permit sliding engagement between the corresponding grooves and plug protuberances and permitting sliding engagement between the plug and socket only at a predetermined orientation or polarization when the protuberances 18 and 19 register with the grooves 34 and 36.

The relative sliding of the plug 10 and socket 11 is a non-shorting sliding in that the contacts of the plug do not touch the contacts of the socket during the sliding.

The grooves 34 and 36 (at their leading end) terminate in and communicate with circumferentially extending channel-shaped grooves as 37 (FIG. 1) which extend approximately 90° clockwise as viewed forwardly from end 33. Also formed in the inner face of the shell 32 in the neighborhood of the head portion 33 are a pair of oppositely disposed channel-shaped circumferential grooves 38 which extend clockwise from each of the longitudinal grooves 34 and 36 for approximately 90°. The longitudinal spacing between grooves 37 and 38 is equal to the longitudinal spacing between the plug protuberances 18 and 19. Thus, plug 10 may be inserted into socket 11 upon proper polarization, and following the full insertion of the plug within the socket, the plug may be rotated clockwise 90°, as viewed from the open end of the socket, the protuberances 18 and 19 engaging and locking in grooves 37 and 38.

Formed in the inner face of the inner shell 32 are two diametrically opposed longitudinal sets of circumferentially extending channel-shaped recess 40 which are disposed between grooves 34 and 36. The center spacing between successive recesses 40 is substantially the same as the spacing between successive plug contact elements 20 or 21, and the recesses 40 of the opposite sets are laterally aligned. Disposed in each of recesses 40 is a contact element 41 formed of a resilient strip of metal. Each contact element 41 includes a curved section 42 having its convex portion directed inwardly towards the axis of shell 32 and provided with a centrally facing protuberance 43 adapted to engage recess 22 formed in the corresponding plug contact element 20 or 21. Radially projecting arm 44 extends from one end of the contact element curved portion 42 through the wall of inner shell 32 and terminates in a circumferentially extending lug 46 which is substantially super-imposed upon the outer wall of inner shell 32. The free end of contact element curved portion 42 is oppositely bent, as at 47, and bears against the base of the corresponding recess 40. The crown of the contact element convex portion 42, as well as the protuberance 43, project inwardly of the inner cylindrical wall of the shell 32 when in normal unstressed condition. The contact elements 20, 21 and 41 may be formed of any suitable conducting material such as brass or the like and are preferably electroplated in accordance with conventional practice with palladium or other suitable metal to provide greater corrosion-and abrasion-resistance and a better electrical contact surface.

The contacts 20 and 21 of the plug do not touch the contacts 41 of the socket during the sliding of the plug into the socket. Thus, the relative sliding of the plug 10 and socket 11 is a non-shorting sliding.

An intermediate cylindrical shell 49 is formed of an insulating material such as a plastic material, and may be integrally formed with the inner shell 32 or firmly adhered thereto. Lugs 46 of the contact elements 41 are embedded in the intermediate shell 49 and are connected to insulator covered conductors 50a, which are also embedded in the intermediate shell 49 and extend longitudinally in the wall of the shell through the leading end thereof. It should be noted that the insulation covering 50a as well as that covering conductors 23 associated with the connector plug may be color-coded in the well-known manner. A tubular metal shell 51a tightly engages the intermediate shell 49, the leading edge thereof being inwardly inclined to engage the corresponding beveled surface of said intermediate shell, as in FIG. 3.

Embedded in the base or leading end of the shell 32 is the mate of the plug-carried optical fiber coupling members and includes a collar member 66, preferably made from metal for strength and resiliency. Located rearwardly of the base end of the collar 66 and formed integrally therewith are inwardly and outwardly directed peripheral flanges 67 and 68 respectively; flange 68 registering with a corresponding groove formed in shell 32. In addition, inwardly directed flange 67 has a further, thinner inwardly directed flange 310. Further inward flange 310 prevents inserting optical fiber 104 too far into socket 11 in the direction of the socket head 33 (FIG. 1). Like the plug optical coupling member 55, the socket optical coupling member 65 also includes rails 104 and teeth 105 (see FIGS. 7A and 7B) projecting inward from an optical fiber retainer 56. In the case of the socket 11, the teeth 105 are directed toward the flanges 67 and 310 and so resist the optical fiber 104 from backing out of the socket once the optical fiber is inserted into the socket up to the innermost flange 310.

In coupling the plug and socket, plug 10 is aligned with and oriented relative to socket 11 so that the protuberances 18 and 19 engage the longitudinal grooves 34 and 36 respectively. As plug 10 is slid into socket 11, the flats 17 thereof confront the socket contact elements 41, whereas the plug contact elements 20 and 21 do not engage the contact elements 41 but merely slide along the inner surface of the insulating shell 32. When plug 10 is fully inserted in socket 11, the optical coupling member 55 is in engagement with the optical coupling member 65 and rotatable relative thereto. The optical fiber plug terminus 101a (see FIG. 2) is in near contacting registry with the optical fiber socket terminus 101b and collar 51 is in nesting contact with collar 66.

In order to effect engagement between the contact plug elements 20 and 21 and the socket contact elements 41, the plug is rotated clockwise, as seen in FIG. 7A. In this latter position, the plug and socket are in coupled contact closed position. As plug 10 is rotated relative to socket 11, the plug contact elements are conveyed along the socket contact elements 41 resiliently urging the latter forwardly until the contact recesses 22 are in registry with the contact protuberances 43, in which position and the plug and socket are in contact closed position.

The reverse procedure is followed in effecting a contact open position and subsequently uncoupling the plug from the socket.

Figure 6:
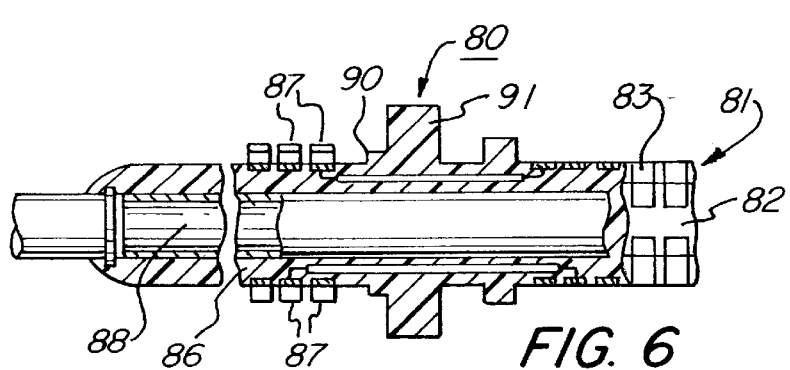
FIG. 6 is a fragmentary sectional view taken along line 6—6 in FIG. 5.

In FIGS. 5 and 6 of the drawing, there is illustrated another embodiment of the present invention differing from that above described primarily in that a contact post is provided on the plug for facilitating the connections thereto, it being understood that such expedient may be employed with the socket as well. Specifically, plug 80 comprises a leading coupling section 81 similar in construction to plug 10 as above described, including a shank 82 carrying the contact elements 83 and an optical fiber coupling member 84 in the manner earlier described. Coaxial with and projecting rearwardly from the trailing head end of the shank 82 is a tubular post 86, along the length of which is mounted a plurality of longitudinally and circumferentially spaced metal connector ears or lugs 87 provide with arms which project through the wall of the post 86 into the interior thereof. Each of the contact elements 83 is electrically connected to a respective lug 87 by a corresponding conductor extending along the interior of shank 82 and post 86.

An optical fiber 88 extends through post 86 and out its trailing end, and is connected to the optical fiber coupling member 84 in the manner earlier described.

An open ended tubular housing 89 is provided and has at least its inner face formed of an insulating material. The housing 89 is slidable over post 86 with its peripheral wall radially spaced therefrom the leading inner border of the housing 89 separably snugly engaging an annular shoulder 90 formed on the trailing face of the plug head 91. Insulation covered conductors 92 have their ends soldered or otherwise connected to corresponding lugs 87 and together with the coaxial cable 88 extend through the trailing opening of the housing 89 and are connected as desired. Plug 80 may be employed with socket 11 as earlier described or with a socket modified in the manner of plug 80.

It is sometimes advantageous to plate the plug optical fiber face 104a and socket optical fiber face 104b using a thin layer of chromium, preferably 0.00025 inch. In such an embodiment, the closest approach of the two faces 104a and 104b of optical fiber is 0.0005 inch. In the preferred embodiment, however, the optical fiber faces 104a and 104b are not plated, because they do not actually abut since they are kept slightly separated by the thin inner flange 310 in the plug 11. In other embodiments where the optical fiber faces 104a and 104b would otherwise actually abut, using a thin plating of chromium (approximately 0.00025 inch on each face) will prevent cracking and spalling of the optical fibers being joined.

It is clear from the drawings and corresponding description that the present invention also comprehends a connector for simultaneously connecting a multi-conductor and- not just a single optical fiber, but also several optical fibers. In such an embodiment, one optical fiber connection (i.e. both the plug and socket components for connecting two lengths of optical fiber) would act as a key for aligning the other optical fiber connections. In some applications, such a key optical fiber connection could be coaxial with the overall plug and socket. In other applications of the multi-conductor and multi-optical fiber connector embodiment, the key optical fiber connection could be offset from the center of the plug. For example, in case of a connector for connecting two pairs of optical fiber lengths (to form two optical fibers), both optical fiber connections are advantageously offset from the center of the connector, with one of the optical fiber connections serving as a key. As in the preferred embodiment (FIGS. 2, 3, 4, 7A and 7B), each optical fiber connection would include (in both the plug and socket) an optical fiber retainer 56, rails 104, and teeth 105.

It is to be understood that the above-described arrangements are only illustrative of the application of the principles of the present invention. Numerous modifications and alternative arrangements may be devised by those skilled in the art without departing from the spirit and scope of the present invention, and the appended claims are intended to cover such modifications and arrangements.

What is claimed is:

1. An electro-optical connector comprising a socket connector member having an elongated longitudinally extending cavity formed therein, a plurality of longitudinally spaced mutually insulated first contact elements disposed within said cavity, a mating plug connector member slidably registering with said cavity between advanced and retracted positions and having a leading end directed toward the base of said cavity, a plurality of longitudinally spaced, mutually insulated second contact elements disposed along said plug, means maintaining a predetermined angular orientation between said plug and socket during relative sliding thereof and permitting relative rotation thereof at said plug advanced position, said first and second contact elements being out of engagement at said predetermined angular orientation and in engagement upon rotation in a single predetermined sense from said predetermined angular orientation to a closed contact position, and separable engagable collar members and optical fiber lengths coaxial with and extending to the leading end of said plug and at the base of said cavity and defining an optical fiber connector, said optical fiber connector being in a coupled condition when said plug is in its cavity advanced position.

2. The electro-optical connector of claim 1 wherein one of said collar members nests in the other of said collar members when said plug is in said advanced position.

3. An electro-optical connector in accordance with claim 1, including a plurality of longitudinally aligned sets of said longitudinally spaced second contact elements and a corresponding plurality of longitudinally aligned sets of said first longitudinally spaced contact elements wherein the peripheries of said sets of second contact elements are of arcuate configuration extending circumferentially of the plug for less than 360° and in a straight line, lengthwise of the connector.

4. An electro-optical connector in accordance with claim 1, wherein said socket includes a well portion defined by a cylindrical wall, the inner surface thereof having longitudinally spaced recesses formed therein, said first contact elements being located in said recesses and normally projecting above the upper edges thereof and being resiliently inwardly urged by said second contact elements during engagement therewith, and including lugs connected to said first contact elements and projecting through said cylindrical wall.

5. The electro-optical connector of claim 1 wherein said orienting means is defined by at least one longitudinally extending groove formed in one of said connector members and at least one slidably engaging protuberance mounted on the other of said members.

6. The electro-optical connector of claim 1 wherein each of said longitudinally extending grooves terminates in a circumferentially extending groove disposed forward of the leading of said contact elements.

7. The electro-optical connector of claim 1 wherein the plug and socket each further comprise an optical fiber retainer substantially cylindrical in form, the plug optical fiber retainer extending along the length of the plug to the leading end of the plug, and the socket optical fiber retainer extending along the length of the socket to the base of the cavity, wherein each optical fiber retainer comprises four resiliently pliable rails extending along the length of the optical fiber retainer, the four rails so shaped and so positioned so as to exert a radial force tending to center and align the optical fibers so as to be coaxial with the optical fiber retainer.

8. The electro-optical connector of claim 1 wherein the optical fiber retainers of the plug and socket further comprise teeth projections, the plug teeth projections angled toward the leading end of the plug, and the socket teeth projections angled toward the base of the cavity, the teeth projections thereby providing resistance to any backing out of the optical fiber within the plug optical fiber retainer away from leading end of the plug, or within the socket optical fiber retainer away from the base of the cavity.

9. An electro-optical connector comprising a socket connector member having an elongated, longitudinally extending cavity formed therein, a plurality of longitudinally-spaced mutually insulated first contact elements disposed within said cavity, a mating plug connector member slidably registering with said cavity between advanced and retracted positions and having a leading end directed toward the base of said cavity, a plurality of longitudinally-spaced, mutually insulated second contact elements disposed along said plug, means maintaining a predetermined angular orientation between said plug and socket during relative sliding thereof and permitting relative rotation thereof at the advanced position of said plug, said first and second contact elements being out of engagement at said predetermined angular orientation and in engagement upon rotation from said predetermined angular orientation to a closed contact position, separable engagable first and second collar members and first and second optical fibers coaxial with and extending to the leading end of said plug and at the base of said cavity respectively and defining an optical fiber connector, said optical fiber connector being in a coupled condition when said plug is in its cavity-advanced position, and a tubular strength member housed in and extending coaxially longitudinally along said plug and connected to said plug mounted collar.

10. The electro-optical connector of claim 9 including mutually a insulated leads disposed within said plug extending through the outer end of said plug and longitudinally along the outer face of said tubular strength member and connected to respective of said second contact elements.

11. The electro-optical connector of claim 9 including an insulator post affixed to and projecting rearwardly from said plug, said tubular strength member extending rearwardly through said insulator post, a plurality of spaced terminal elements mounted on said post, and mutually insulated leads extending longitudinally along the outer face of said tubular strength member and connecting said terminal elements to respective of said second contact elements.

12. The electro-optical connector of claim 10 wherein the plug and socket each further comprise an optical fiber retainer substantially cylindrical in form, the plug optical fiber retainer extending along the length of the plug to the leading end of the plug, and the socket optical fiber retainer extending along the length of the socket to the base of the socket, wherein each optical fiber retainer comprises four resiliently pliable rails extending along the length of the optical fiber retainer, the four rails so shaped and so positioned so as to exert a radial force tending to center and align the optical fibers so as to be coaxial with the optical fiber retainer.

13. The electro-optical connector of claim 12 wherein the optical fiber retainers of the plug and socket further comprise teeth projections, the plug teeth projections angled toward the leading end of the plug, and the socket teeth projections angled toward the base of the socket, the teeth projections thereby providing resistance to any backing out of the optical fiber within the plug optical fiber retainer away from leading end of the plug, or within the socket optical fiber retainer away from the base of the cavity.

* * * * *

UNITED STATES PATENT AND TRADEMARK OFFICE
CERTIFICATE OF CORRECTION

PATENT NO. : 6,416,334 B1  Page 1 of 1
DATED : July 9, 2002
INVENTOR(S) : Paul J. Plishner It is certified that error appears in the above-identified patent and that said Letters Patent is hereby corrected as shown below:

Column 3,
Line 49, "subsequently" should be -- subsequent --.

Column 6,
Line 48, "members" should be -- member 55 --.

Column 8,
Line 8, "and-" should be -- and --.

Signed and Sealed this

Twenty-sixth Day of November, 2002

Attest:

JAMES E. ROGAN
Attesting Officer   Director of the United States Patent and Trademark Office